(12) United States Patent
Komura et al.

(10) Patent No.: US 8,490,173 B2
(45) Date of Patent: Jul. 16, 2013

(54) UNAUTHORIZED COMMUNICATION DETECTION METHOD

(75) Inventors: Masahiro Komura, Kawasaki (JP); Masashi Mitomo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 12/222,114

(22) Filed: Aug. 1, 2008

(65) Prior Publication Data

US 2009/0055919 A1 Feb. 26, 2009

(30) Foreign Application Priority Data

Aug. 10, 2007 (JP) ................................. 2007-210019

(51) Int. Cl.
*H04L 63/0227* (2006.01)
(52) U.S. Cl.
USPC .............................................. 726/13; 726/11
(58) Field of Classification Search
None
See application file for complete search history.

(56) References Cited

U.S. PATENT DOCUMENTS

| | | | | |
|---|---|---|---|---|
| 5,351,231 | A * | 9/1994 | King et al. | 369/59.2 |
| 7,246,376 | B2 * | 7/2007 | Moharram | 726/23 |
| 7,525,919 | B2 * | 4/2009 | Matsui et al. | 370/238 |
| 2002/0138649 | A1 * | 9/2002 | Cartmell et al. | 709/245 |
| 2005/0022000 | A1 * | 1/2005 | Inomata et al. | 713/200 |
| 2005/0154681 | A1 * | 7/2005 | Schmelzer | 705/67 |
| 2006/0198313 | A1 * | 9/2006 | Kitamura et al. | 370/241 |
| 2009/0034521 | A1 * | 2/2009 | Kato | 370/389 |
| 2009/0322899 | A1 * | 12/2009 | Chan et al. | 348/222.1 |

FOREIGN PATENT DOCUMENTS

| | | |
|---|---|---|
| JP | 2006-279930 | 10/2006 |
| WO | 2007/081023 A1 | 7/2007 |
| WO | WO 2007/110951 | * 10/2007 |

OTHER PUBLICATIONS

Guo et al., "Web Robot Detection Techniques Based on Statistics of Their Requested URL Resources," 2002, IEEE, pp. 302-307.*
Genova et al., "Using Signatures to Improve URL Routing," 2002, IEEE, pp. 45-53.*
Japanese Office Action issued Jul. 12, 2011 in corresponding Japanese Patent Application 2007-210019.

* cited by examiner

*Primary Examiner* — Luu Pham
(74) *Attorney, Agent, or Firm* — Staas & Halsey LLP

(57) ABSTRACT

According to an aspect of an embodiment, a method for controlling an apparatus for transferring data from a plurality of first devices to a second device via a network, the data being transferred by using a packet, comprises the steps of: extracting type information identifying type of software conveyed by a packet and destination information identifying destination of the packet transmitted from one of the first devices; counting the number of kinds of the type information extracted from packets associated with the same destination information, respectively; and determining an unauthorized communication when the number of kinds of the type information is less than a predetermined value.

2 Claims, 6 Drawing Sheets

FIG. 4

| ACCESS DESTINATION ADDRESS INFORMATION (7521) | USER-AGENT #1 SOFTWARE INFORMATION (7522) | USER-AGENT #2 SOFTWARE INFORMATION | USER-AGENT #3 SOFTWARE INFORMATION | USER-AGENT #4 SOFTWARE INFORMATION |
|---|---|---|---|---|
| URL 1 | USER-AGENT 1 | USER-AGENT 2 | USER-AGENT 3 | – |
| URL 2 | USER-AGENT 1 | USER-AGENT 3 | USER-AGENT 4 | USER-AGENT 5 |
| URL 3 | USER-AGENT 99 | – | – | – |
| : | : | : | : | : |

FIG. 5

| USER-AGENT SOFTWARE INFORMATION (7531) | ACCESS DESTINATION #1 ADDRESS INFORMATION (7532) | ACCESS DESTINATION #2 ADDRESS INFORMATION | ACCESS DESTINATION #3 ADDRESS INFORMATION | ACCESS DESTINATION #4 ADDRESS INFORMATION |
|---|---|---|---|---|
| USER-AGENT 1 | URL 1 | URL 2 | URL 3 | – |
| USER-AGENT 2 | URL 1 | URL 3 | URL 4 | URL 5 |
| USER-AGENT 3 | URL 99 | – | – | – |
| : | : | : | : | : |

FIG. 6

UNAUTHORIZED COMMUNICATION DETECTION METHOD

BACKGROUND OF THE INVENTION

1. Field of the Invention

An aspect of the invention relates to techniques of the communication via the network.

2. Description of the Related Art

In the communication via the network, there is an illegal communication between a web server and a client. For example, a technology for detecting the illegal communication is disclosed in Japanese Laid-open Patent Publication No. 2006-279930.

To implement unauthorized communication, there exist methods that use HyperText Transport Protocol (HTTP) that is used in transmitting and receiving data between a web server and a client. Since the HTTP is used by clients to access a web server, even in firewalls that are systems to prevent unauthorized communication, communication is permitted. Accordingly, by using the HTTP, the unauthorized communication can be realized through the firewalls. Since the procedures in the unauthorized communication are not disclosed, the procedures are not known.

SUMMARY

According to an aspect of an embodiment, a method for controlling an apparatus for transferring data from a plurality of first devices to a second device via a network, the data being transferred by using a packet, comprises the steps of: extracting type information identifying type of software conveyed by a packet and destination information identifying destination of the packet transmitted from one of the first devices, counting the number of kinds of the type information extracted from packets associated with the same destination information, respectively; and determining an unauthorized communication when the number of kinds of the type information is less than a predetermined value.

DESCRIPTION OF THE PREFERRED EMBODIMENTS

Hereinafter, an embodiment according to the invention will be described with reference to the appended drawings. Fist, a communication utilizing the HTTP is explained, then an example of unauthorized communications targeted in this embodiment is explained, and then a method for detecting unauthorized communications is specifically described.

At first, a communication utilizing the HTTP is explained. As a technique for realizing unauthorized communications, there is a method for utilizing HyperText Transfer Protocol (HTTP) used when data is exchanged between a Web server and a client. Since HTTP is one that is used when a user accesses the Web server, communications are permitted even through a FireWall, which is a system for preventing unauthorized communications. This causes a problem in that unauthorized communications are realized traversing the FireWall by taking advantage of HTTP. Because the procedures of unauthorized communications are not open to the public, the procedures are unclear. However, it is possible to analogically infer whether pertinent communications are unauthorized communications, by focusing attention on a feature of User-Agents contained in HTTP. The User-Agent represents a kind of browser, which is software used when a client browses Web pages. User-Agents can be set by the client at its choice. In many cases, however, in the User-Agent, the following pieces of information created by the client are set: the name of a camouflaged browser, the name of an authentic browser, and the name of an operating system (OS). Hence, hundreds of kinds of User-Agents exist, and there are cases where even if the name of browsers is the same, their contents are mutually different. Hereinafter, features of User-Agents in authorized communications and unauthorized communications utilizing HTTP will be described. These features are obtained by analogically inferring from a packet or a communication log storing the packet.

In the case of authorized communications utilizing HTTP, a plurality of clients accesses an identical Web server. Consequently, as a feature, when the number of kinds of User-Agents is counted for each Uniform Resource Locater (URL) representing the Web server, the number naturally increases.

On the other hand, in the case of unauthorized communications utilizing HTTP, a specific client accesses a specific Web server. Consequently, as a feature, even when the number of kinds of User-Agents is counted for each URL, the number does not increase.

Next, an example of unauthorized communications targeted in this embodiment is explained.

[1. Example of Unauthorized Communications]

Figure 1:
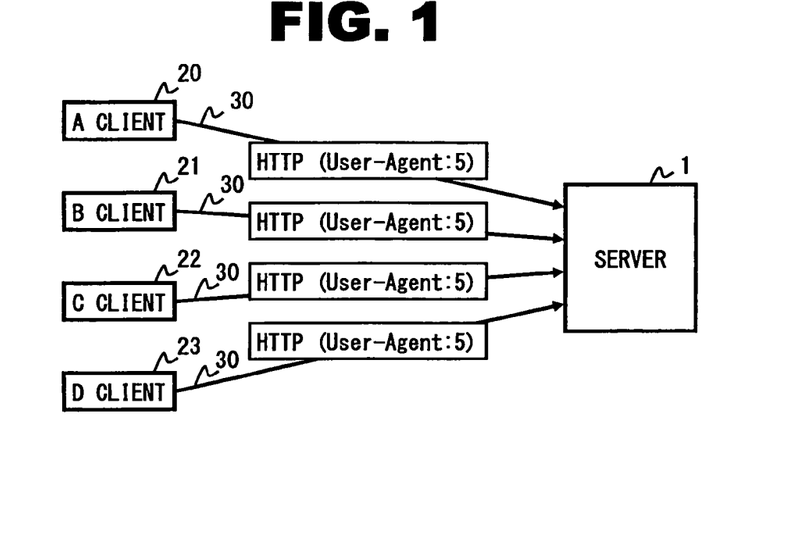
FIG. 1 is a schematic diagram showing an example of unauthorized communications.
Figure 2:
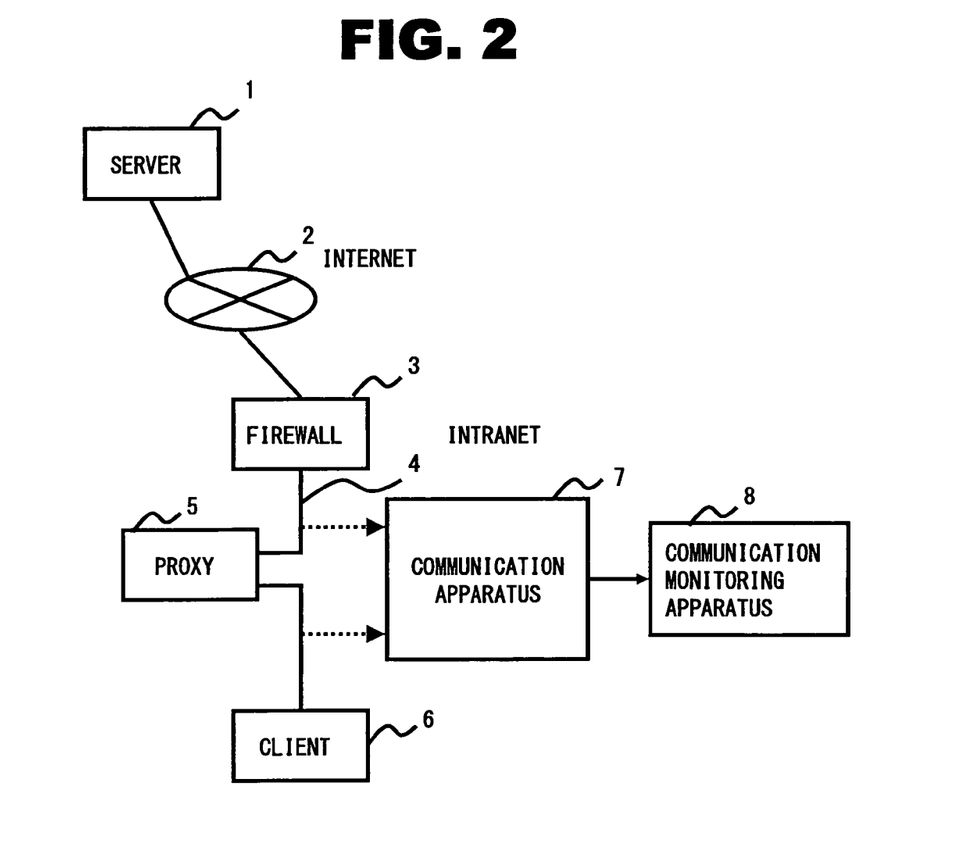
FIG. 2 is an overall block diagram of a communication system according to an embodiment of the invention.

FIG. 1 is shows an example of unauthorized communications targeted in this example. "A" client 20, "B" client 21, "C" client 22, and "D" client 23 are each a client making unauthorized communications. The User-Agents included in respective browsers installed in these clients are the same. A server 1 is a Web server making unauthorized communications. As a feature, when the number of kinds of User-Agents is counted based on HTTP packets 30 received from the clients, since the kind of the User-Agent is identical, the number does not increase. Why this feature appears is because unauthorized communications are made between specific clients and respective specific servers. This feature, as described above, does not appear in authorized communications. As shown in FIG. 2, it is analogically inferred that unauthorized communications are realized by exchanging, between a client 6 and the server 1, packets in each of which unauthorized communication information for making unauthorized communications is set in a region relating to HTTP. Here, the User-Agent or the URL as described before is also information contained in the region relating to HTTP in the packet. The FireWall 3 or a Proxy 5 located between the client 6 and the server 1 is set so as to permit HTTP for the purpose of permitting Web accesses of authorized servers. As a result, the client 6 and the server 1 can freely exchange packets containing unauthorized communication information. Therefore, by installing a communication device capable of detecting the above-described feature of unauthorized communications between the server 1 and the client 6, unauthorized communications can be found.

[2. Overall Block Diagram]

FIG. 2 is an overall block diagram of a communication system according to the embodiment of the invention. The communication system according to the embodiment comprises the server 1, the Internet 2, a FireWall 3, an Intranet 4, the Proxy 5, the client 6, a communication device 7, and a communication monitoring device 8.

The server 1, which is an information processing device conformable to HTTP, is a device serving as a communication destination of the client 6 operated by a user attempting unauthorized communications. The server 1 may also be referred to as the first device. The Internet 2 is a global scale network system connecting individual information processing devices to exchange information. The FireWall 3 is a system for preventing unauthorized packets from invading the Intranet 4. The Intranet 4 is a network constructed in a corporate, using standard techniques of the Internet 2. The Proxy 5 is an information processing device for establishing connection with the Internet 2 as a "proxy", instead of an information processing device connected to the Intranet 4 that cannot be directly connected to the Internet 2. The client 6, which is an information processing device conformable to HTTP, is a device operated by a user attempting unauthorized communications. The client 6 may also be referred to as the second device. The communication device 7 is a device for detecting unauthorized communications made between the server 1 and the client 6. Upon detecting unauthorized communications, the communication device 7 notifies the communication monitoring device 8 of detection information indicating that effect. The communication monitoring device 8 is a device for receiving the detection information transmitted by the communication device 7.

[3. Block Diagram of Hardware of Communication Device]

Figure 3:
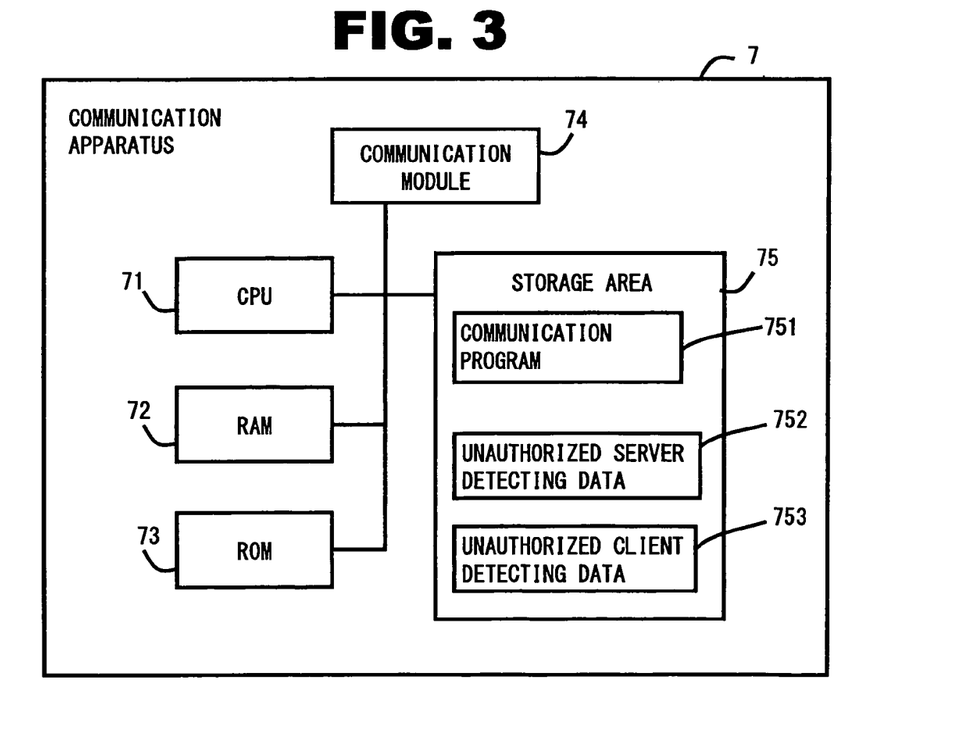
FIG. 3 is a block diagram of hardware of a communication device.

FIG. 3 is a block diagram showing an example of hardware of the communication device 7. The communication device 7 comprises a central processing unit (CPU) 71, a random access memory (RAM) 72, a read only memory (ROM) 73, a communication portion 74, and a storage region 75.

The CPU 71 is a device for executing a communication program 751. The RAM 72 is a device for storing data for executing the communication program 751 or data temporarily required by the communication program 751. The region for storing the above-described data temporarily required may also be referred to as a "temporary storage region". The ROM 73 is a device for restoring once written data. The ROM 73 may restore the communication program 751. The communication portion 74 is a device having charge of communications with the server 1, the FireWall 3, the Proxy 5, the client 6, and the communication monitoring device 8. The communication portion 74 is conformable to a protocol such as Transmission Control Protocol (TCP)/Internet Protocol (IP) and HTTP, which are standard techniques of the Internet 2. The storage region 75 is a region for storing the communication program 751, unauthorized server detecting data 752, and unauthorized client detecting data 753. The storage region 75 is a region existing in an external storage device such as a hard disk (not shown). The communication program 751 describes a command for actuating the communication device 7 to detect a packet related to unauthorized communications based on the communication log. The unauthorized server detecting data 752 is data used by the communication program 751 for detecting servers making unauthorized communications. The unauthorized client detecting data 753 is data used by the communication program 751 for detecting clients making unauthorized communications.

[4. Configuration Diagram of Unauthorized Server Detecting Data]

Figure 4:
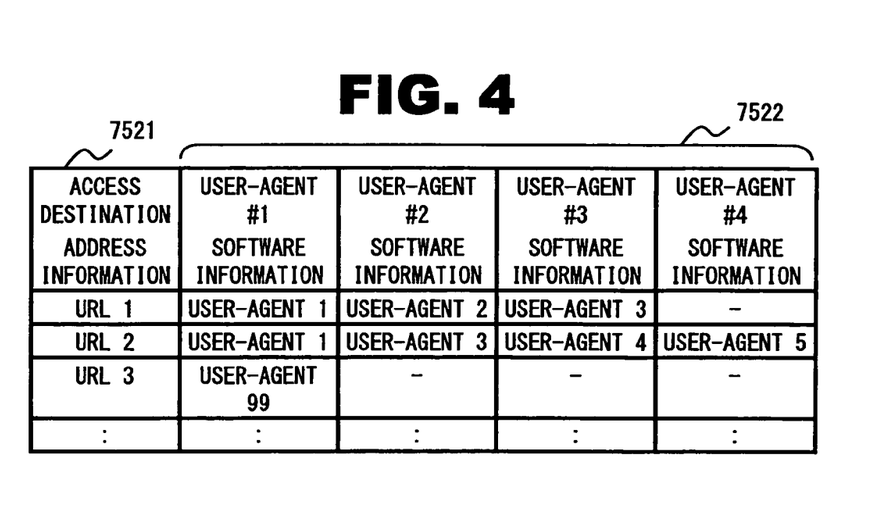
FIG. 4 is a configuration diagram of data for detecting unauthorized servers.

FIG. 4 is a configuration diagram of unauthorized server detecting data shown in FIG. 3. The unauthorized server detecting data 752 is created on the RAM 72 when the CPU 71 executes the communication program 751. Constituent components of the unauthorized server detecting data 752 are access destinations 7521 and User-Agents 7522. The access destination 7521 refers to a server that is an access destination of a client. The access destination 7521 is represented by URL, which is a descriptive method for indicating the location of a resource existing on the Internet. The User-Agent 7522 refers to the kind of a browser installed in the client. User-Agents can be set by the client at its choice. In many cases, however, in User-Agents, the following pieces of information created by the client are set: the name of a camouflaged browser, the name of an authentic browser, and the name of an operating system (OS). The User-Agent 7522 may be also referred to as software information.

[5. Configuration Diagram of Unauthorized Client Detecting Data]

Figure 5:
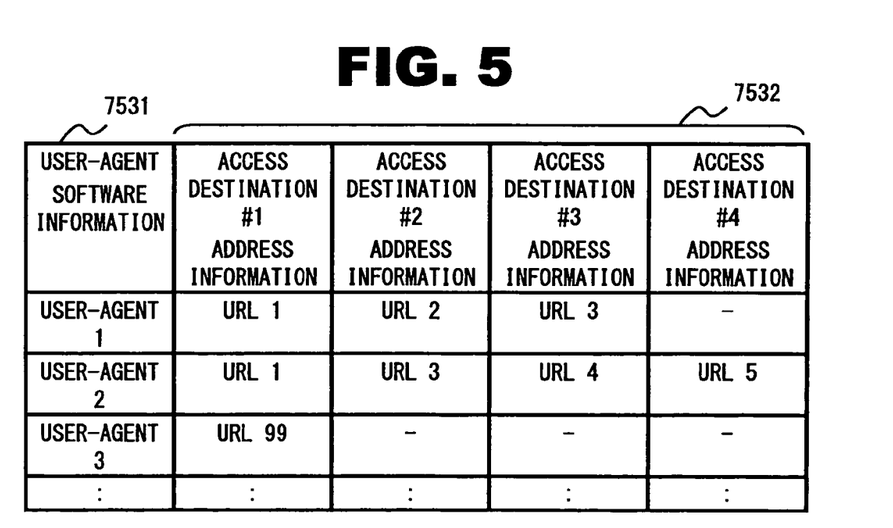
FIG. 5 is a configuration diagram of data for detecting unauthorized clients.

FIG. 5 is a configuration diagram of unauthorized client detecting data 753 in FIG. 3. The unauthorized client detecting data 753 is created on the RAM 72 when the CPU 71 executes the communication program 751. Constituent components of the unauthorized client detecting data 752 are User-Agents 7531 and access destinations 7532. The User-Agent 7531 is identical to the User-Agent 7522 in FIG. 4. The access destination 7532 is identical to the access destination 7521 in FIG. 4.

[6. Configuration Diagram of Packet]

Figure 6:
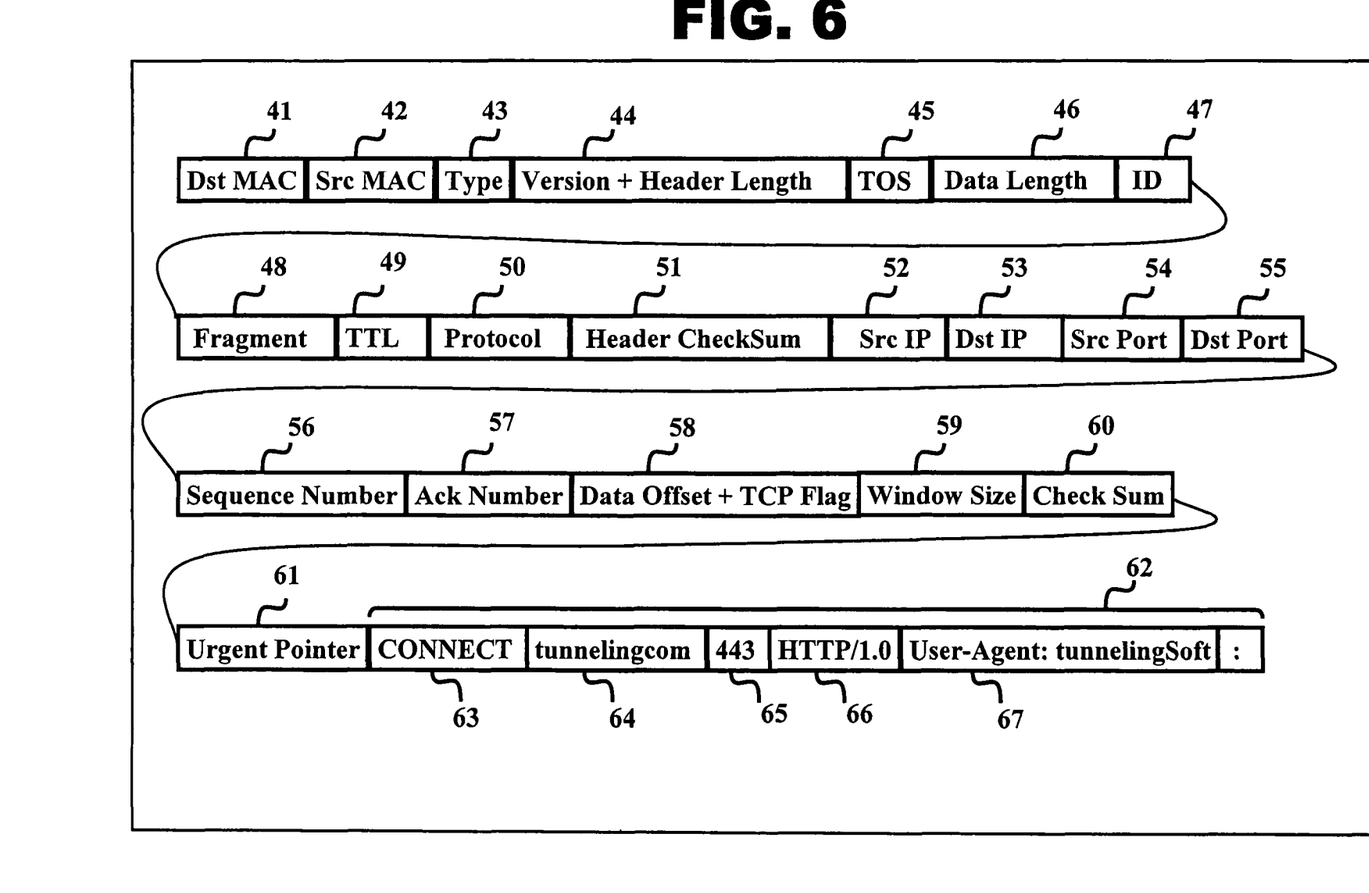
FIG. 6 is a configuration diagram of a packet.

FIG. 6 shows a packet received by the communication device 7 from the server 1, or any one of the FireWall 3, the Proxy 5, and the client 6. Information elements contained in the packet are: Dst MAC 41, Src MAC 42, type 43, version+header length 44, TOS 45, data length 46, ID 47, fragment 48, TTL 49, protocol 50, HeaderCheckSum 51, Src IP 52, Dst IP 53, Src port 54, Dst port 55, sequence number 56, Ack number 57, data offset+TCP flag 58, window size 59, CheckSum 60, urgent pointer 61, HTTP messages 62. The portion from the Dst MAC 41 to the type 43 represents MAC headers. The portion from the Src port 54 to the urgent pointer 61 represents TCP headers.

The Dst MAC 41 represents the MAC address of a destination of this packet. The term "MAC" here refers to media access control. The Src MAC 42 represents the MAC address of a source of this packet. The type 43 represents the type of a protocol. The version+header length 44 represents the version of an IP protocol and the length of an IP header. The TOS 45 represents priority when a packet is to be transmitted. The data length 46 represents the total length of the packet. The data length 46 is length information representing the length of the packet. The ID 47 represents the number for identifying an individual packet. The fragment 48 represents whether the packet is one that has been divided. The TTL 49 represents the time to live of the packet. The protocol 50 represents the number of a protocol. The HeaderCheckSum 51 represents data for detecting an error. However, the HeaderCheckSum 51 is not used at present. The Src IP 52 represents the IP address of a source of this packet. The Dst IP 53 represents the IP address of a destination of this packet. The Src port 54 represents the port number of the source of this packet. The Dst port 55 represents the port number of the destination of this packet. The sequence number 56 represents a number by which the reception side identifies transmitted data. The Ack number 57 represents a number by which the transmission side identifies received data. The data offset+TCP flag 58 represents a location in which data is stored and communication control information (TCP flag). The communication control information constitutes establishment information for establishing a session or disconnect information for disconnecting the session. The term "data" here refers to the HTTP messages 62. Also, the communication control information refers to the establishment information [SYN] representing the communication establishment, response information [ACK] representing a response from the reception side, forced termination information [RST] representing forced termination, or disconnection information [FIN] representing disconnection. The window size 59 represents data amount that can be collectively transmitted without waiting for reception ascertainment. The CheckSum 60 represents data for checking whether there is an error. The urgent pointer 61 represents the location of data to be urgently processed. The HTTP messages 62 represent data used in HTTP. The HTTP messages 62 constitute control information. Method information 63 represents processing performed in HTTP communications. The URL 64 represents a server as a destination. The URL 64 may also be referred to as "destination information". The port number 65 represents a sub-address subordinated to IP address in order to simultaneously establish connections with a plurality of partners. A version of HTTP 66 represents the type of HTTP. A User-Agent 67 represents the kind of a browser installed in a client. The User-Agent 67 constitutes software information.

[7. Flowchart of Unauthorized Communication Detection Processing (First)]

Figure 7:
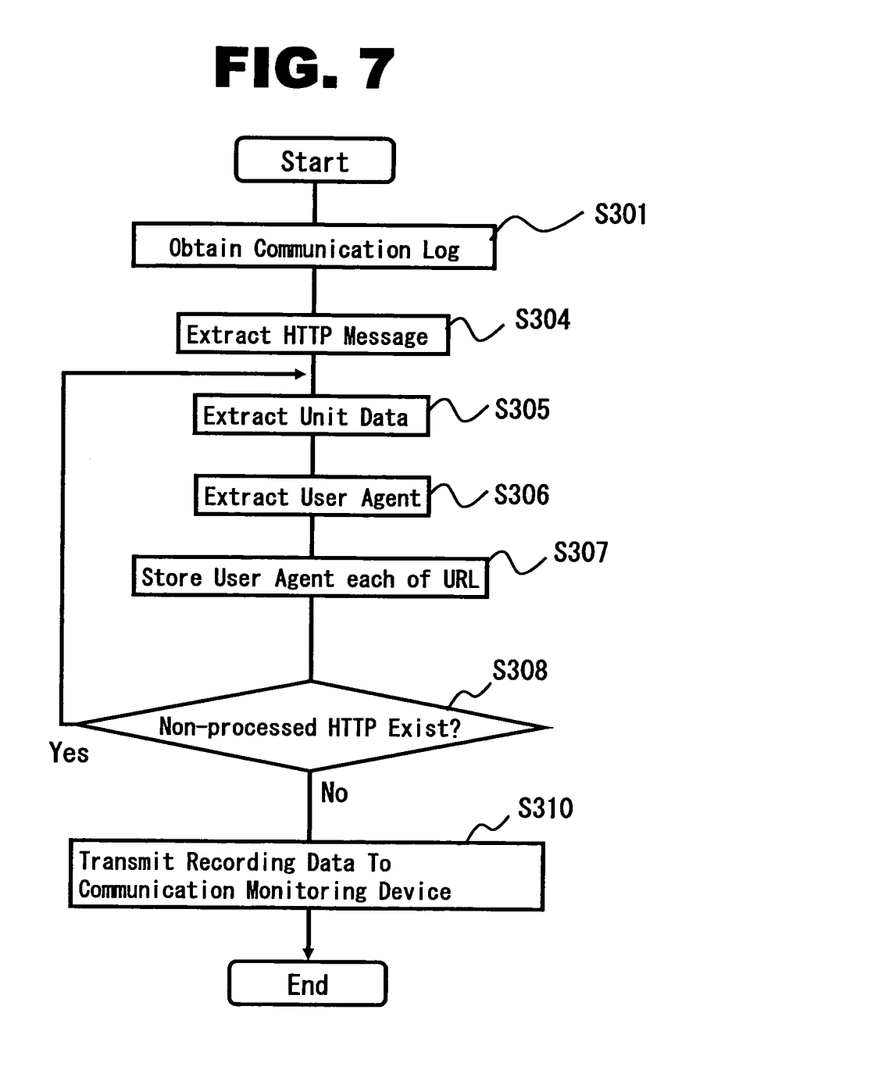
FIG. 7 is a flowchart of unauthorized communications detection processing (first)

FIG. 7 is a flowchart showing procedures used when the communication device 7 detects a server making unauthorized communication. The CPU 71 of the communication device 7 executes the communication program 751 to thereby implement processing for detecting a server making unauthorized communication. For example, CPU 71 executes the processing every predetermined time.

In step S301, the CPU 71 acquires a communication log. The term "log" here refers to one in which packets received from the server 1, or any one of the FireWall 3, the Proxy 5, and the client 6 by the communication device 7 are accumulated in the storage region 75 together with dates and times at which the packets are received. Each of the packets is identical to the one illustrated in FIG. 6. The above-described dates and times are acquired from a clock managing mechanism (not shown) included in the communication device 7. The acquisition opportunity of this communication log can be arbitrarily set by a manufacturer or a user of the communication device 7. The CPU 71 acquires the communication log from the storage region 75, and stores the acquired communication log in the temporary storage region.

In step S304, the CPU 71 extracts HTTP messages from packets related to the communication log acquired in S301. The CPU 71 extracts the number of HTTP messages. This extraction is performed in a way such that, after having calculated a starting address and an ending address of the HTTP messages 62, the CPU 71 extracts data between the starting address and the ending address. The starting address is calculated by adding the version+header length 44, the data offset+TCP flag 58, and 1 byte to 14 bytes. The ending address is calculated by adding the data length 46 to 14 bytes. The 14 bytes is a summed length of the Dst MAC 41, the Src MAC 42, and the type 43. Then, the CPU 71 stores the extracted HTTP messages in the temporary storage region. The CPU 71 also stores the number of the extracted HTTP messages as a HTTP message number, in the temporary storage region.

In step S305, the CPU 71 extracts the URL 64 in the HTTP messages 62 extracted in S304. A method for the extraction is as follows. Firstly, the CPU 71 extracts, from the above-described packets, a packet of which the top is any one of "CONNECT", "GET", "POST" and "HEAD". The "CONNECT" is an instruction used when a client get connection to a server. The GET is a command for the client to take out information possessed by the server. The POST is a command for transmitting information from the client to the server. The HEAD is a command for the client to take out attribute information contained in the information possessed by the server. Secondly, the CPU 71 extracts URLs 64 from the HTTP messages 62 extracted in the first processing. The URL 64 may be also referred to as an "access destination". The CPU 71 stores the extracted URLs 64 in the temporary storage region.

In step S306, the CPU 71 extracts the User-Agents 67 in the HTTP messages 62 extracted in step S304. Then, the CPU 71 stores the extracted User-Agents 67 in the temporary storage region.

In step S307, the CPU 71 records the URLs 64 and the User-Agents 67 in the unauthorized server detecting data 752 in FIG. 4. The URLs 64 are ones that have been extracted in S305. The User-Agents 67 are ones that have been extracted in S306. The CPU 71 records the User-Agents 67 for each of the URLs 64. This recording is one in which kinds of the User-Agents 67 are counted for each of the URLs 64. Specifically, this recording is performed as follows. If the URL 64 does not exist in an access destination 7521, the CPU 71 stores the URL 64 in the access destination 7521. Then the CPU 71 stores the User-Agent 67 in a User-Agent 7522 corresponding to the access destination 7521. On the other hand, if the URL 64 exists in the access destination 7521, the CPU 71 does not store the URL 64 in the access destination 7521. Next, if the User-Agent 67 does not exist in the User-Agent 7522 corresponding to the URL 64, the CPU 71 stores the User-Agent 67 in the User-Agent 7522. On the other hand, if the User-Agent 67 exists in the User-Agent 7522 corresponding to the URL 64, the CPU 71 does not store the User-Agent 67 in the User-Agent 7522. Lastly, the CPU 71 subtracts 1 from the number of HTTP message number in step S301.

In step S308, the CPU 71 determines whether there are unprocessed HTTP messages. This determination is one in which the CPU 71 determines whether the HTTP message number stored in the temporary storage region is 0. As a result of this determination, when the HTTP message number is 0, the CPU 71 performs the processing in step S310. As a result of this determination, when the HTTP message number is not 0, the CPU 71 performs the processing in step S305.

In step S310, the CPU 71 creates a packet containing recording data and transmits the packet to the communication monitoring device 8. The recording data is the unauthorized server detecting data 752. The CPU 71 extracts the unauthorized server detecting data 752 from the storage region 75. The CPU 71 extracts the IP address of the communication monitoring device 8 stored in the storage region 75. The CPU 71 creates a packet containing the unauthorized server detecting data 752 and the IP address of the communication monitoring device 8. The CPU 71 transmits the created packet to the communication monitoring device 8. A user of the communication monitoring device 8 finds a possible server related to unauthorized communications, from the unauthorized server detecting data 752 that has been notified. The server related to the unauthorized communication is a server that can be specified by a URL that is small in the number of kinds of User-Agents as compared with the case of the other servers.

As an output of the recording data, the CPU 71 may create a message meaning unauthorized communications related to a URL in which the number of kinds of User-Agents is not more than a threshold value, to transmit the message to the communication monitoring device 8. The term "threshold number" here is a number that has been set by the manufacturer or users of the communication device 7. The threshold number is, for example, 1. This value has been adopted for sorting out a URL that has the highest possibility of being making unauthorized communications, in the recorded information. Or otherwise, the CPU 71 determines the communication as an illegal communication on the basis of proportion of the number of kinds of User-Agents to the number of packets. The CPU 71 extracts a session starting time, a URL, and a client IP address form the communication log. The session starting time is a date and a time at which the session of a packet of which the appearance number has been detected to be not more than the threshold value, has been established. Specifically, these date and time is a date and a time at which a packet in which the establishment information [SYN] has been set in its TCP flag has been received, the packet existing immediately before the packet of which the appearance number has been detected to be not more than the threshold value. The URL and the client IP address exist in the HTTP messages 62 of the packet of which the appearance number has been detected to be not more than the threshold value. The CPU 71 creates data indicating that "the User-Agent accessing a site is specific", the data being set as a detection reason. The CPU 71 extracts the IP address of the communication monitoring device 8 stored in the storage region 75. The CPU 71 creates a packet containing the session starting time, the URL, the client IP address, and the detection reason. The CPU 71 transmits the created packet to the communication monitoring device 8.

Figure 9:
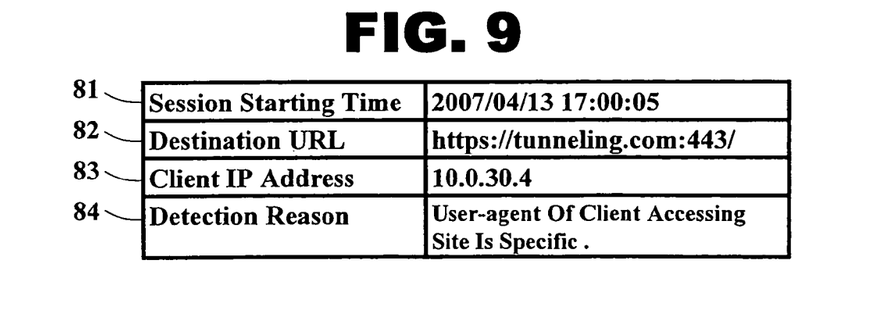
FIG. 9 is a diagram showing an example of messages meaning unauthorized communications.

FIG. 9 shows an example of messages meaning unauthorized communications. The session starting time 81 is a date and a time at which a packet in which the establishment information [SYN] has been set in its TCP flag has been received, the packet existing immediately before the packet of which the appearance number has been detected to be not more than the threshold value. The destination URL 82 presents a URL existing in the HTTP messages 62 of the packet of which the appearance number has been detected to be not more than the threshold value. The client IP address 83 represents a client IP address existing in the HTTP messages 62 of the packet of which the appearance number has been detected to be not more than the threshold value. The detection reason 84 represents a reason for being detected as unauthorized communications.

[8. Flowchart of Unauthorized Communication Detection Processing (Second)]

Figure 8:
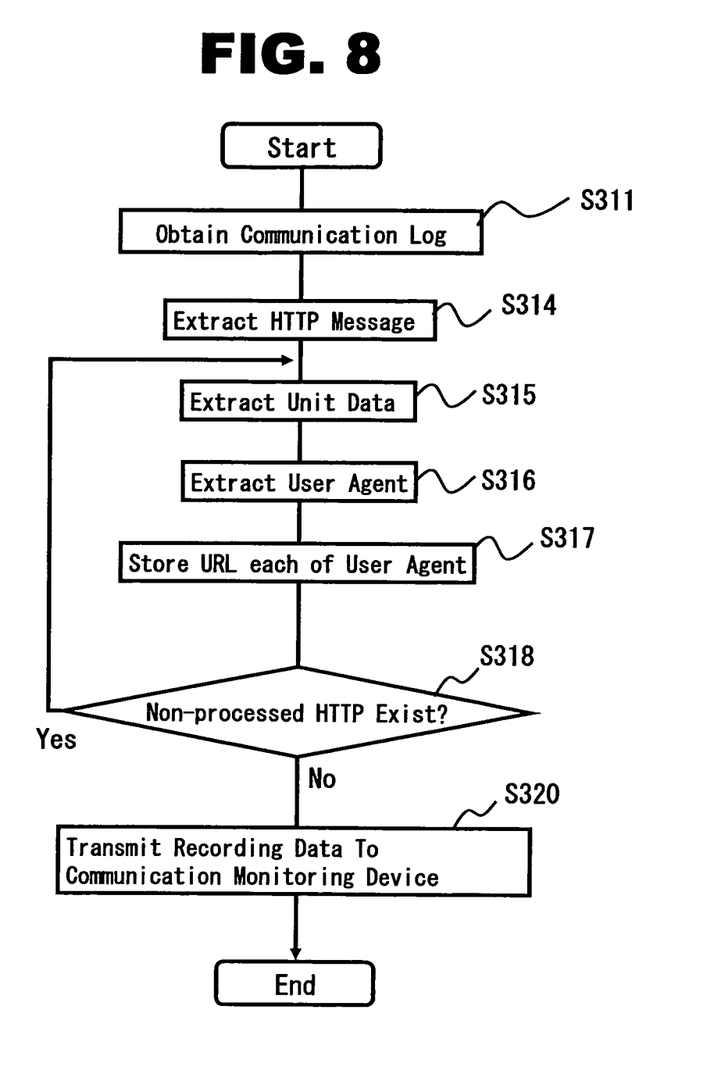
FIG. 8 is a flowchart of unauthorized communication detection processing (second)

FIG. 8 is a flowchart showing procedures used when the communication device 7 detects a client making unauthorized communications. The CPU 71 of the communication device 7 executes the communication program 751 to thereby implement processing for detecting a client making unauthorized communication. For example, CPU 71 executes the processing every predetermined time.

The processes from steps S311 to S316 are the same as those from steps S301 to S306 in FIG. 7.

In step S317, the CPU 71 records the URLs 64 and the User Agents 67 in the unauthorized client detecting data 753 in FIG. 5. The URLs 64 are ones that have been extracted in step S315. The User Agents 67 are ones that have been extracted in step S316. The URLs 64 are recorded for each of the User Agents 67. This recording is one in which kinds of the URLs 64 are counted for each of the User Agents 67. Specifically, the recording is performed as follows. If the User Agent 67 does not exist in a User-Agent 7531, the CPU 71 stores the User Agent 67 in the User-Agent 7531. Then, the CPU 71 stores the URL 64 in an access destination 7532 corresponding to the User Agent 67. On the other hand, if the User Agent 67 exists in the User-Agent 7531, the CPU 71 does not store the User Agent 67 in the User-Agent 7531. Next, if the URL 64 does not exist in the access destination 7532 corresponding to the User Agent 67, the CPU 71 stores the URL 64 in the access destination 7532. On the other hand, if the URL 64 exists in the User-Agent 7532 corresponding to the User Agent 67, the CPU 71 does not store the URL 64 in the access destination 7532. Lastly, the CPU 71 subtracts 1 from the number of HTTP messages stored in step S311.

The process in step S318 is the same as that in step S308 in FIG. 7.

In step S320, the CPU 71 creates a packet containing recording data, and transmits the packet to the communication monitoring device 8. The recording data is the unauthorized client detecting data 753. The CPU 71 extracts the unauthorized client detecting data 753 from the storage region 75. The CPU 71 extracts the IP address of the communication monitoring device 8 stored in the storage region 75. The CPU 71 creates a packet containing the unauthorized client detecting data 753 and the IP address of the communication monitoring device 8. The CPU 71 transmits the created packet to the communication monitoring device 8. A user of the communication monitoring device 8 finds a possible client related to unauthorized communications, from the unauthorized client detecting data 753 that has been notified. The client related to the unauthorized communication is a client that can be specified by a User-Agent that is small in the number of kinds of URLs as compared with the case of the other clients.

As an output of the recording data, the CPU 71 may create a message meaning unauthorized communications related to a User-Agent in which the number of URLs is not more than a threshold value, to transmit the message to the communication monitoring device 8. The term "threshold number" here is one that has been set by the manufacturer or users of the communication device 7. The threshold number is, for example, 1. This value has been adopted for sorting out a URL that has the highest possibility of being making unauthorized communications, in the recorded information. Or otherwise, the CPU 71 determines the communication as an illegal communication on the basis of proportion of the number of kinds of URLs to the number of packets. This message is equivalent to the message in step S310 in FIG. 7. The only difference from the message in S310 is in the content of the detection reason. The term "detection reason" here refers to that the User-Agent of a client accessing a site is specific.

Having described the invention as related to the embodiment, the invention is not limited to the embodiment but may be otherwise variously embodied without departing from the scope of the appended claims.

It is a purpose of the embodiments to detect unauthorized communications on the basis of a feature analogically inferred from a received packet.

As described above, the embodiments can produces an effect of allowing detection of unauthorized communications, based on the feature obtained by analogically inferring from received packets, or communication logs storing the received packets. Furthermore, the invention can produce an effect of allowing providing notification of information related to unauthorized communications to the manager of a network.

What is claimed is:

1. A method for controlling an apparatus for transferring data from a plurality of first devices to a second device via a network, said data being transferred by using a packet, the method comprising:

obtaining a communication log recording packets received from at least one of a server, firewall, a proxy and a client;

identifying address ranges including a starting address and an ending address;

extracting HyperText Transfer Protocol messages from the packets stored in a memory of the apparatus based on information with regard to address ranges;

extracting uniform resource locator information and a User-Agent from each of the HyperText Transfer Protocol messages, the uniform resource locator information indicating destination information of the HyperText Transfer Protocol messages, the User-Agent indicating a type of software used by each of the first devices;

counting a number of User-Agents, extracted from the HyperText Transfer Protocol messages, for each uniform resource locator information extracted from the HyperText Transfer Protocol messages stored in the memory of the apparatus; and for each uniform resource locator information, determining, by using the processor, a HyperText Transfer Protocol message is unauthorized communication when the number of the User-Agents for the uniform resource locator information is at least a predetermined number.

2. An apparatus for transferring data from a plurality of first devices to a second device via a network, said data being transferred by using a packet, the apparatus comprising:

a hardware processor; and a memory storing packets and computer executable instructions that when executed by said hardware processor cause said hardware processor to perform operations including:

obtaining a communication log recording packets received from at least one of a server, firewall, a proxy and a client;

identifying address ranges including a starting address and an ending address;

extracting HyperText Transport Protocol messages from the packets stored in said memory based on information with regard to address ranges;

extracting uniform resource location information and a User-Agent from each of the HyperText Transfer Protocol messages, the uniform resource location information indicating destination information of one of the HyperText Transfer Protocol messages, and the User-Agent indicating a type of software used by one of the first devices;

counting a number of User-Agents, extracted from the HyperText Transfer Protocol messages, for each uniform resource location information extracted from the HyperText Transfer Protocol messages stored in the memory of the apparatus; and for each uniform resource locator information, determining a HyperText Transport Protocol message related to unauthorized communication when the number of the User-Agents for the uniform resource location information is at least a predetermined number.

* * * * *